United States Patent [19]

Moeck

[11] Patent Number: 5,051,015

[45] Date of Patent: Sep. 24, 1991

[54] PROTECTIVE CAP FOR A WRITING, DRAWING OR APPLICATOR IMPLEMENT

[75] Inventor: Gerhard Moeck, Kirchehrenbach, Fed. Rep. of Germany

[73] Assignee: Schwan-Stabilo Schwanhäusser GmbH & Co., Nuremberg, Fed. Rep. of Germany

[21] Appl. No.: 364,820

[22] Filed: Jun. 12, 1989

[30] Foreign Application Priority Data

Jun. 23, 1988 [DE] Fed. Rep. of Germany ....... 3821195

[51] Int. Cl.$^5$ ................................................. B43K 5/00
[52] U.S. Cl. .................................... 401/202; 401/213; 401/243
[58] Field of Search ................. 401/213, 245, 202, 243

[56] References Cited

U.S. PATENT DOCUMENTS

| | | | |
|---|---|---|---|
| 4,459,059 | 7/1984 | Greenspan | 401/213 |
| 4,844,642 | 7/1989 | Inaba | 401/213 |

FOREIGN PATENT DOCUMENTS

| | | | |
|---|---|---|---|
| 0204252 | 12/1986 | European Pat. Off. | |
| 3728896 | 6/1988 | Fed. Rep. of Germany | |
| 61-11016 | 4/1986 | Japan | |
| 321717 | 6/1957 | Switzerland | 401/213 |
| 2174374 | 11/1984 | United Kingdom | |
| 2215279 | 9/1989 | United Kingdom | 401/213 |

Primary Examiner—Richard J. Apley
Assistant Examiner—D. F. Crosby
Attorney, Agent, or Firm—Bachman & Lapointe

[57] ABSTRACT

A protective cap for a writing, drawing or applicator element comprises an outer casing portion and within same a closure cap portion which has a cover portion for sealingly covering over the applicator member of the implement. The cap portion is connected to the casing portion by means of ribs which define between them through openings through which the interior of the cap is in fluid communication with the exterior thereof. The through openings are of an overall cross-section of at least 5 mm$^2$ in order at least to reduce the risk of asphyxiation if the cap is unintentionally swallowed. The ribs are disposed in the region of the cover portion of the cap portion and are extended in the axial direction of the cap over the cover portion, whereby the through openings are oriented in particular in a radial direction.

3 Claims, 2 Drawing Sheets

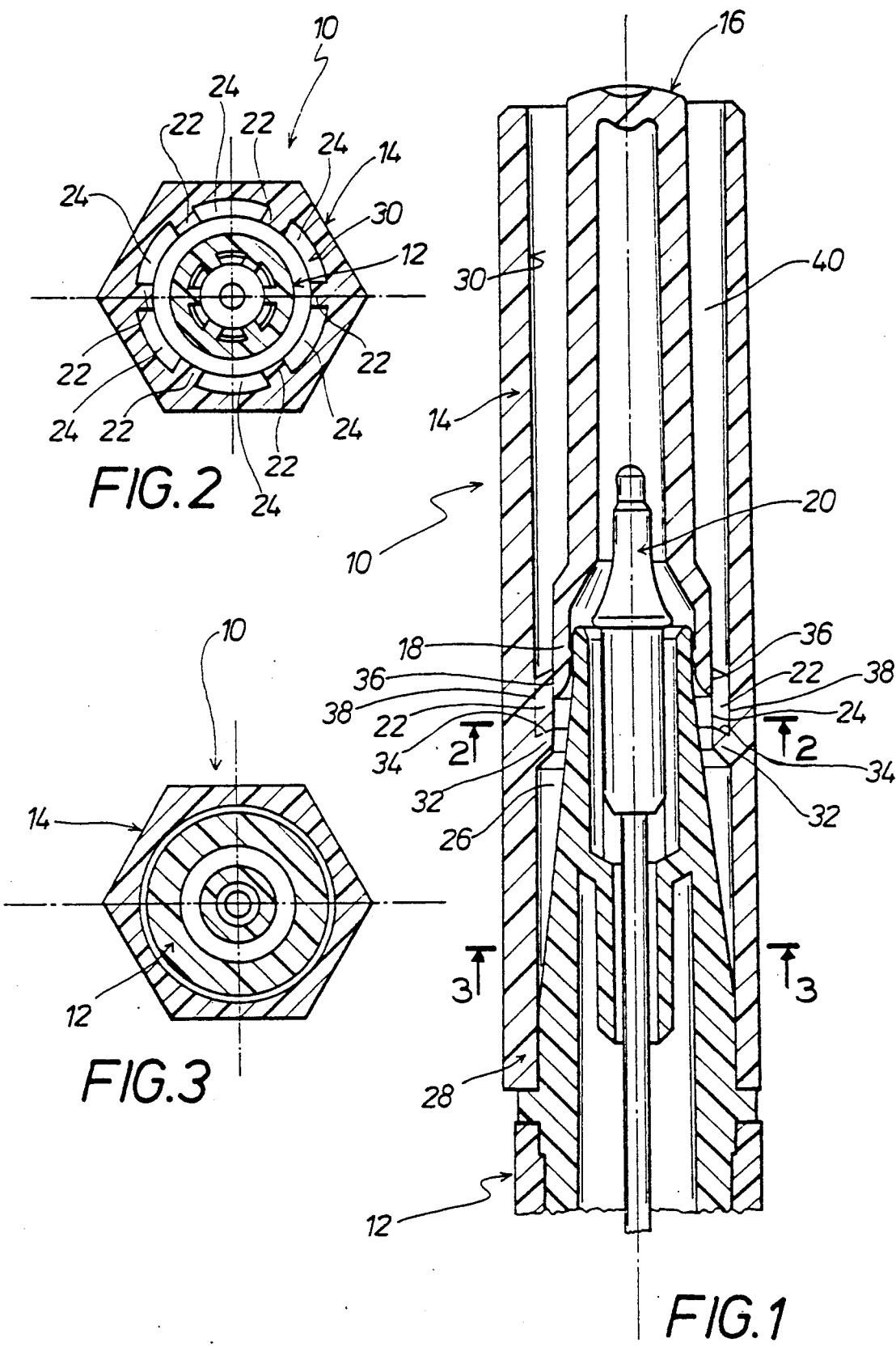

PROTECTIVE CAP FOR A WRITING, DRAWING OR APPLICATOR IMPLEMENT

BACKGROUND OF THE INVENTION

The invention relates generally to a protective cap for a writing, drawing or applicator implement.

For the sake of convenience in this specification, the term applicator element will be used generally to denote an implement as referred to above for writing, drawing or applying a material, on the basis that writing and drawing also involve applying material to a surface.

One form of protective cap for an applicator implement, as disclosed in JP-A-61-11 016, comprises an outer casing portion and a cap-like closure portion which is disposed in the outer casing portion and which has an insert portion for sealingly closing off an applicator member of the implement. The outer casing portion and the closure portion are connected by means of ribs which are uniformly distributed circumferentially of the cap, with openings between the ribs. In that construction the closure portion is either integrally connected to the outer casing portion or it is in the form of an independent component which is then joined to the outer casing portion. At any event the cap has through openings which are defined between the closure portion and the outer casing portion and which are separated from each other by the above-mentioned ribs. Although no reference is made in the above-indicated specification to a mould arrangement for producing the cap, which involves a particular design of sliding inserts for producing the through openings, it can be assumed that the mould arrangement will in fact include a sliding insert with fingers and with slots between the fingers for moulding the through openings in the cap. It is also to be assumed that the mould arrangement will have two sliding inserts which come to bear against each other in an obtuse position in the course of the moulding operation, due to the configuration to be formed in the moulded cap. That means that the possibility of damage to the sliding inserts or vibration in particular in respect of the fingers of the one sliding insert cannot be excluded.

Protective caps of the above-indicated design configuration in which the through openings are of a relatively large cross-sectional area of at least 5 mm$^2$ can be designed without causing serious problems for use with applicator implements of relatively large cross-section, insofar as the cap for the implement is also of a correspondingly large cross-section. In contrast thereto however it is a very complicated matter for relatively small protective caps, that is to say caps of small cross-sectional dimensions, to be produced with through openings which are of a large cross-sectional area as referred to above. The last-mentioned implements which are of relatively small cross-section are for example pencil-slim writing, drawing or other applicator implements.

Another form of closure cap, as disclosed in GB-A-21 74 374, seeks to provide that the risk of asphyxiation in the event of the cap being swallowed is at least reduced by virtue of the closure portion being connected to the screw-on portion of the cap by means of ribs which define through openings therebetween. The ribs are disposed on the outside of the cap and extend over the entire axial length thereof. The fact that the ribs are disposed on the outside of the cap means that there is a risk of injury to the airways in the event of the cap being accidentally swallowed.

In yet another form of closure cap for writing, drawing or painting implements, as disclosed in DE 37 28 896 Cl, the cap has an insertion opening, an internal space which is open at one end, and at least one axially disposed air passage which extends along the stem or body portion of the cap. The air passage is disposed within the outside wall of the body portion of the cap and it is covered in a radially outward direction by a suitable cover configuration. The air passage is open at its ends and at least one opening thereof communicates with a recess disposed at one side of the body portion of the cap. Manufacture of that cap involves essentially the same problems as those discussed above in relation to JP-A-61-11 016, namely, regarding the movement of the sliding inserts of the moulding arrangement and the possibility of vibration thereof, which can have an adverse effect on the quality of the moulding.

SUMMARY OF THE INVENTION

An object of the present invention is to provide a protective cap for an applicator implement which is also and more particularly suitable for implements of relatively small cross-section.

Another object of the present invention is to provide a protective cap for an applicator implement which is relatively simple to produce in spite of having at least one through opening therein to reduce the risk of asphyxiation in the event of the cap being accidentally swallowed.

In accordance with the present invention, these and other objects are achieved by a protective cap for an applicator implement comprising an outer casing portion and a closure cap portion which is disposed in the outer casing portion. The cap portion has a cover portion for sealingly covering an applicator member of the implement, with a plurality of ribs connecting the cap portion to the outer casing portion. The ribs are uniformly distributed in the circumferential direction of the cap and between them define through openings which between the cap portion and the outer casing portion provide a total cross-sectional area of at least 5 mm$^2$. The ribs are provided in the region of the cover portion of the cap portion and are extended in the axial direction over the cover portion.

As will become readily apparent hereinafter, the fact that the ribs defining the through openings between the outer casing portion and the cap portion are axially extended over the cover portion of the cap portion means that it is possible for the mould arrangement for producing a protective cap of the configuration in accordance with the invention then to include two sliding inserts of which only one has fingers and slots between the fingers. The fingers of that one sliding insert form the through openings in the cap while the recesses or slots in the sliding insert produce the ribs in the cap, which connect the outer casing portion to the cap portion. The second sliding insert of the mould arrangement which is movable in the axially opposite direction relative to the first sliding insert bears in the moulding position snugly against the portion of the first sliding insert which carries the fingers and the slots between same. The fact that the two sliding inserts which are movable in opposite relationship to each other bear snugly against each other in the above-indicated fashion provides that the sliding inserts are satisfactorily guided relative to each other and also have a self-centering effect so that the cap can be relatively easily produced, even when it is of small cross-sectional dimensions. Suitable dimensioning of the sliding inserts of the mould arrangement make it readily possible to produce the cap with through openings of a suitable total cross-sectional area.

In accordance with a preferred embodiment of the cap a shoulder is integrally formed on the inward surface of the outer casing portion and the ribs are integrally connected to the shoulder in front of the cover portion of the cap portion. The shoulder not only provides for mechanical reinforcement, reducing the risk of the ribs being accidentally broken, but also gives the advantage that the two sliding inserts of the mould arrangement for producing the cap do not come into contact with each other by way of their end face portions but only with the peripheral surface portions which define the through openings in the cap.

In another embodiment of the invention the ribs and the shoulder are of a radial extent which corresponds to the radial dimension of the annular gap formed between the outer casing portion and the cap portion. In that embodiment the individual ribs, in conjunction with the inward surface of the outer casing portion, the outward surface of the closure portion and the shoulder, provide a relatively large integral connecting portion so as to ensure that the cap is of a mechanically strong design configuration in that area.

In another embodiment of the cap the ribs are of a radial extent which corresponds to the radial dimension of the wall of the closure portion, while the shoulder is of a radial extent which corresponds to the radial dimension of the annular gap between the outer casing portion and the cap portion. In that configuration of the cap the individual ribs are integrally formed on the annular end face of the cap-like closure portion and on the inwardly facing cylindrical surface of the shoulder.

Irrespective of the specific configuration of the ribs defining the through openings between the cap portion and the outer casing portion and the above-mentioned shoulder, the through openings are formed by two sliding inserts of the mould arrangement for producing the cap coming into contact with each other. The fact that the two sliding inserts come into contact directly with each other in that way at the same time provides for centering of the two sliding inserts relative to each other. In that way it is possible for the two sliding inserts to be moved towards and away from each other relatively quickly so that the cycle times involved in producing caps of that configuration can be comparatively short while it is also possible to produce through openings with a minimum total cross-sectional area of 5 mm$^2$ even when the caps themselves are of only small cross-sectional dimensions, as in the case of pencil-slim applicator implements.

There is also the advantage that, by virtue of the ribs being at least substantially uniformly distributed in the circumferential direction of the cap, the cap which is made for example from a suitable plastic material hardens uniformly so that the amount of production wastage is minimal.

Further objects, features and advantages of the present invention will be apparent from the following description of embodiments of the cap according to the present invention.

BRIEF DESCRIPTION OF THE DRAWINGS

FIG. 1 is a view in longitudinal section through a protective cap according to the invention, together with a part of an applicator implement in the form of a writing implement, FIG. 2 is a view in section taken along line II—II in FIG. 1, FIG. 3 is a view in section taken along line III—III in FIG. 1.

DESCRIPTION OF THE PREFERRED EMBODIMENTS

Figure 4:
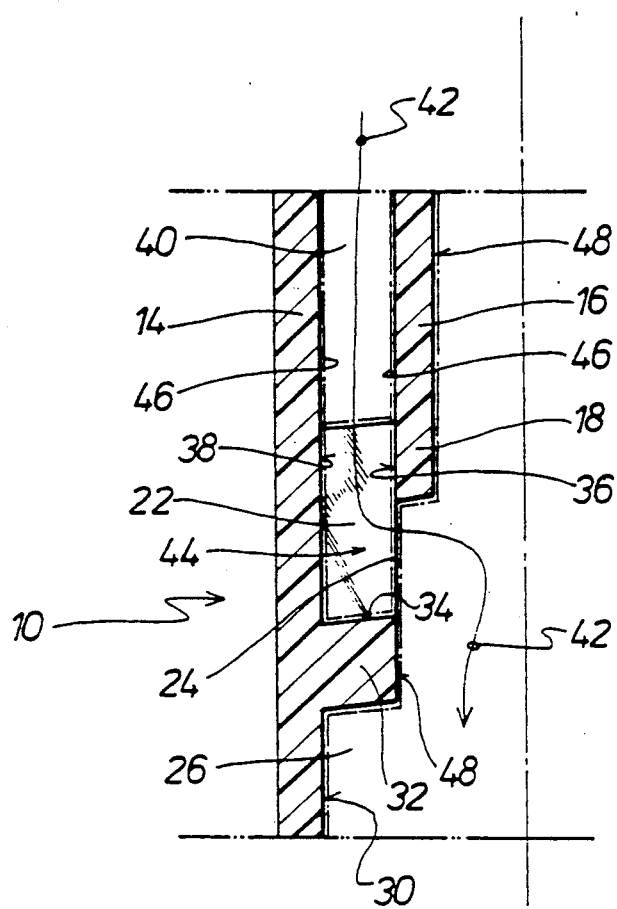
FIG. 4 is a view on an enlarged scale and in longitudinal section through a part of a cap as shown in FIG. 1.

Referring firstly to FIG. 1, shown therein is a view in longitudinal section of a protective cap 10 and part of an applicator implement indicated generally at 12. The cap 10 comprises a push-on or outer casing portion 14 and a cap-like closure portion 16 which is disposed within the casing portion 14 in coaxial relationship therewith. The cap portion 16 has a cover portion 18 with which it sealingly covers over the applicator member 20 of the implement 12, when the cap is in the position of being fitted on to the implement 12. The cap portion 16 is connected to the casing portion 14 by means of a plurality of ribs 22 which are at least substantially uniformly distributed in the circumferential direction of the cap 10 and which define between them through openings 24 which provide a fluid communication between the interior as indicated at 26 of the cap 10 and the exterior of the cap 10.

As can be clearly seen from FIG. 1, the ribs 22 are provided in the region of the cover portion 18 of the cap portion 16. The ribs 22 are extended or prolonged in the axial direction over the cover portion 18 of the closure portion 16 in a direction towards the fitting portion 28 of the casing portion 14, by means of which the cap 10 is fitted on to the applicator implement 12.

Projecting radially inwardly from the inward surface 30 of the casing portion 14 is an annular shoulder 32 which thus extends around the interior of the casing portion 14. The ribs 22 are integrally connected to the shoulder 32. The connecting section between the ribs 22 and the shoulder 32 is identified by reference numeral 34 in FIG. 1 while the connecting section between the ribs 22 and the cover portion 18 of the cap portion 16 is identified by reference numeral 36. Reference numeral 38 identifies the connecting section between each rib 22 and the casing portion 14 of the cap 10.

As indicated above, the ribs 22 which are preferably substantially uniformly distributed around the circumference of the cap 10 or more specifically the through openings 24 defined by the ribs 22 provide a fluid communication between the exterior of the cap 10, and the internal space 26 therein, through the annular gap 40 defined between the casing portion 14 and the cap portion 16 and through the through openings 24. The total cross-sectional area of the through openings 24 is at least 5 mm$^2$, thereby at least substantially eliminating the risk of asphyxiation if a cap 10 of that configuration is accidentally swallowed.

Referring now to FIG. 2, shown in cross-section therein is the outer casing portion 14 with the ribs 22 which project radially inwardly from the inward surface 30 of the casing portion 14 and which between them define the through openings 24 between the adjoining surfaces of the cap structure. Reference numeral 12 in FIG. 2 again identifies the applicator implement which is shown in section.

FIG. 3 shows another view in section through the applicator implement 12 and the casing portion 14 of the cap 10 which is fitted thereon.

Reference will now be made to FIG. 4 to describe some features of the cap 10 in greater detail. Thus FIG. 4 shows a view on a greatly enlarged scale of a configuration of the cap 10 which in principle corresponds to the cap construction shown in FIG. 1. It will be seen from FIG. 4 that the ribs 22 for connecting the closure cap portion 16 to the outer casing portion 14 are prolonged in the axial direction of the cap 10 over the cover portion 14 of the cap portion 16. The ribs 22 are integrally connected to the circumferentially extending shoulder 32 which projects radially inwardly from the inward surface 30 of the casing portion 14 and which extends around the latter. Each rib 22 is integrally connected to the shoulder 32 at the connecting section 34, it is integrally connected to the cap portion 16 at the connecting section 36, and it is integrally connected to the casing portion 14 at the connecting section 38. It should be noted at this point that it would also be possible for the cap 10 to be without the shoulder 32.

The arrow indicated at 42 in FIG. 4 shows the fluid communication between the interior of the cap 10 and the outside thereof. That fluid communication goes through the annular gap 40 between the adjoining parts of the casing portion 14 and the cap portion 16, a space 44 provided between each two adjacent ribs 22 and through the through openings 24, into the interior of the cap 10 as indicated at 26.

Referring still to FIG. 4, shown therein by thin dash-dotted lines 46 is one of the sliding inserts of a mould arrangement for producing the cap 10 illustrated therein. The sliding insert has fingers and slots between the fingers. The fingers are provided to mould the spaces 44 and the slots are provided to produce the ribs 22. A second sliding insert which is also indicated by thin dash-dotted lines 48 in FIG. 4 bears snugly against the first-mentinoed sliding insert 46, along the part of the structure which forms the through openings 24. That relationship between the two sliding inserts provides for centering thereof relative to each other and at the same time directly provides for the formation of the through openings 24. The shoulder 32 prevents the two sliding inserts 46 and 48 coming into direct contact with each other at their end faces. Accordingly the two sliding inserts only come into centering contact with each other along a portion of their respective peripheral surfaces.

Figure 5:
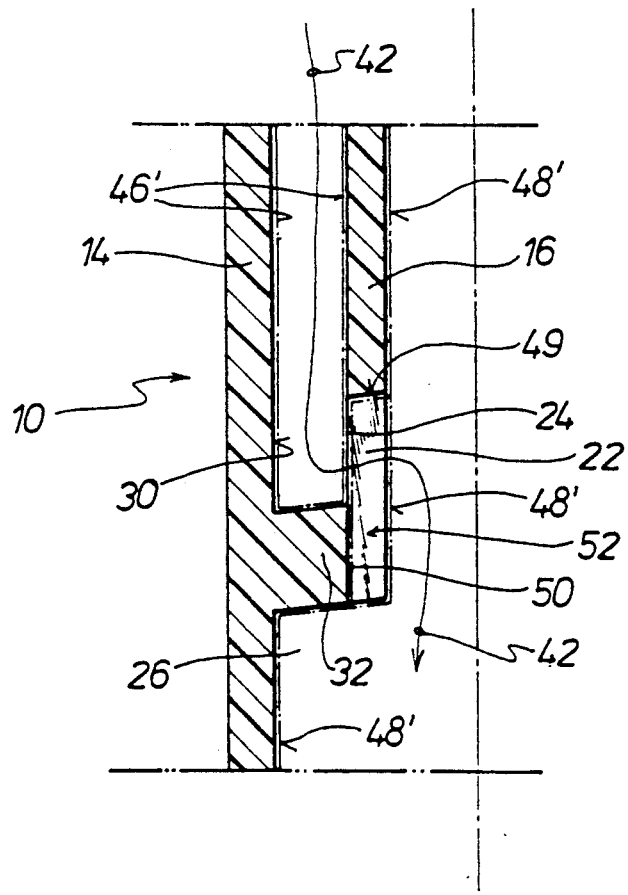
FIG. 5 is a view corresponding to that shown in FIG. 4 through part of a second embodiment of the cap according to the invention.

Reference will now be made to FIG. 5 showing another embodiment of the protective cap 10 in which the closure cap portion 16 is connected to the outer casing portion 14 by means of a plurality of ribs 22. The ribs 22 are of a radial dimension which corresponds to the thickness of the wall of the cap portion 16 in the radial direction. That is in contrast to the ribs 22 in the construction of the cap 10 shown in FIG. 4 in which the ribs 22 are of a radial dimension which corresponds to the dimension of the annular gap 40 in the radial direction.

In FIG. 5 the individual ribs 22 are integrally connected to the cap portion 16 along connecting sections indicated at 49. On the other hand the ribs 22 are connected to the casing portion 14 by means of a shoulder 32 which is integrally formed on the inward surface 30 of the casing portion 14 and which extends circumferentially around same. The individual ribs 22 are also integrally connected to the shoulder 32 along connecting sections as indicated at 50.

The thin dash-dotted lines indicated at 46' and 48' in FIG. 5 represent two sliding inserts of a mould arrangement, which are displaceable in the axial direction in opposite relationship to each other, for moulding the cap 10 shown in FIG. 5. It will also be seen from FIG. 5 that the two sliding inserts 46' and 48' lie directly and snugly against each other along a common part of their respective peripheral surfaces in order to form the through openings 24 at the locations at which they are in contact with each other in that way. In contrast to the sliding inserts 46 and 48 shown in FIG. 4, the sliding inserts 46' and 48' in FIG. 5 are of an overall sleeve-like configuration, without the fingers for producing the openings between the ribs. The sliding insert 48' in FIG. 5, in the region thereof identified by reference numeral 52, has a number of recesses for forming the ribs 22. It would also be possible in this embodiment for the cap to be without the shoulder 32 extending around the entire periphery thereof, in which case the two sliding inserts 46' and 48' come to bear directly against each other with their end portions, that is to say the ribs 22 are formed in such a way as to extend from the connecting section 49 to the inward surface 30 of the casing portion 14.

At any event, the two sliding inserts 46 and 48 in FIG. 4 or 46' and 48' in FIG. 5 have a self-centering action in the region of the cap 10 in which the through openings 24 are formed. That is a particularly important consideration in regard to achieving ease of manufacture and a total cross-sectional area in respect of the through openings 24 of at least 5 mm$^2$, in relation to protective caps 10 of small cross-sectional dimensions.

The arrow 42 in FIG. 5 once again shows the fluid communication between the space 26 within the cap 10 and the exterior thereof. It will be clearly seen therefrom that the through openings 24 are oriented in particular in a radial direction.

It will be appreciated that the above-described caps according to the invention have been described solely by way of example of the invention and that various modifications and alterations may be made therein.

I claim:

1. A protective cap for an applicator implement comprising: an outer casing portion; a closure cap portion disposed in the outer casing portion and having a cover portion for sealingly covering an applicator member of said implement; and a plurality of ribs connecting the cap portion and the outer casing portion, the ribs being at least substantially uniformly distributed in the circumferential direction of the cap and defining through openings between them, the through openings between the cap portion and the casing portion providing a total cross-sectional area of at least 5 mm$^2$ in order to reduce the risk of asphyxiation if the cap is inadvertently swallowed and the ribs being provided in the region of the cover portion of the cap portion and being extended in the axial direction over the cover portion wherein a shoulder is integrally formed on the inward surface of the outer casing portion and wherein the ribs are integrally connected to said shoulder at a location spaced apart from said cover portion.

2. A cap as set forth in claim 1 wherein an annular gap is defined between said outer casing portion and said cap portion, wherein the ribs extend axially within the annular gap and wherein the ribs and the shoulder are of a radial extent which corresponds to the radial dimension of the annular gap.

3. A cap as set forth in claim 1 wherein an annular gap is defined between said outer casing portion and said cap portion, wherein the ribs are aligned with the cap portion and are of a radial extent which corresponds to the radial dimension of the wall of the cap portion and wherein the shoulder is of a radial extent which corresponds to the radial dimension of the annular gap.

* * * * *